United States Patent
Spartz et al.

(10) Patent No.: US 11,029,292 B2
(45) Date of Patent: Jun. 8, 2021

(54) METHOD FOR IDENTIFICATION AND QUANTIFICATION OF SILOXANES IN GASEOUS STREAM

(71) Applicant: MLS ACQ, Inc., East Windsor, CT (US)

(72) Inventors: Martin L. Spartz, Ellington, CT (US); Charles Mark Phillips, Sicklerville, NJ (US); Peter P. Behnke, Vernon, CT (US); Anthony S. Bonanno, Ellington, CT (US)

(73) Assignee: MLS ACQ, INC., East Windsor, CT (US)

( * ) Notice: Subject to any disclaimer, the term of this patent is extended or adjusted under 35 U.S.C. 154(b) by 124 days.

(21) Appl. No.: 16/095,900

(22) PCT Filed: Apr. 7, 2017

(86) PCT No.: PCT/US2017/026631
§ 371 (c)(1),
(2) Date: Oct. 23, 2018

(87) PCT Pub. No.: WO2017/177154
PCT Pub. Date: Oct. 12, 2017

(65) Prior Publication Data
US 2019/0137460 A1        May 9, 2019

Related U.S. Application Data

(60) Provisional application No. 62/319,925, filed on Apr. 8, 2016.

(51) Int. Cl.
*G01N 30/12* (2006.01)
*G01N 30/74* (2006.01)
(Continued)

(52) U.S. Cl.
CPC ......... *G01N 30/74* (2013.01); *G01N 21/3504* (2013.01); *G01N 30/12* (2013.01);
(Continued)

(58) Field of Classification Search
CPC .... G01N 21/3504; G01N 30/12; G01N 30/74; G01N 30/88; G01N 2021/3595;
(Continued)

(56) References Cited

U.S. PATENT DOCUMENTS 3,287,557 A * 11/1966 Bartz ............... G01N 21/05
250/429
4,183,670 A * 1/1980 Russell .............. G01C 19/72
356/470

(Continued)

OTHER PUBLICATIONS

McGoldrick et. al., Concentrations and trophic magnification of cyclic siloxanes in aquatic biota from the Western Basin of Lake Erie, Canada, Environmental Pollution 186 (2014), 141-148 (Year: 2014).*

(Continued)

*Primary Examiner* — David J Bolduc
(74) *Attorney, Agent, or Firm* — HoustonHogle LLP

(57) ABSTRACT

A method and system for detecting siloxanes using thermal desorption tubes and FTIR spectrometers with intervening gas chromatography systems.

16 Claims, 4 Drawing Sheets

(51) Int. Cl.
*G01N 21/3504* (2014.01)
*G01N 30/88* (2006.01)
*G01N 21/35* (2014.01)

(52) U.S. Cl.
CPC ..... *G01N 30/88* (2013.01); *G01N 2021/3595* (2013.01); *G01N 2030/128* (2013.01); *G01N 2030/743* (2013.01); *G01N 2030/884* (2013.01)

(58) Field of Classification Search
CPC ....... G01N 2030/128; G01N 2030/743; G01N 2030/884
See application file for complete search history.

(56) References Cited

U.S. PATENT DOCUMENTS

| | | | | |
|---|---|---|---|---|
| 4,538,910 | A * | 9/1985 | Doyle | G01J 3/453 356/451 |
| 5,200,543 | A * | 4/1993 | Inomata | C07F 7/21 549/215 |
| 5,341,207 | A * | 8/1994 | Tank | G01J 3/06 356/455 |
| 5,440,143 | A * | 8/1995 | Carangelo | G01N 21/031 250/573 |
| 5,457,316 | A * | 10/1995 | Cohen | G01N 27/622 250/282 |
| 5,479,815 | A * | 1/1996 | White | A61B 5/082 600/532 |
| 5,541,728 | A * | 7/1996 | Dierking | G01J 3/4532 356/451 |
| 5,720,798 | A * | 2/1998 | Nickerson | G01N 30/12 96/102 |
| 5,777,735 | A * | 7/1998 | Reagen | G01J 3/453 356/244 |
| 7,092,077 | B2 * | 8/2006 | Kishkovich | B01D 53/22 356/36 |
| 7,552,617 | B2 * | 6/2009 | Danilchik | G01N 1/28 73/23.41 |
| 8,462,347 | B2 | 6/2013 | Phillips et al. | |
| 9,606,088 | B2 | 3/2017 | Spartz et al. | |
| 2003/0184733 | A1 * | 10/2003 | Kameoka | G01N 21/1702 356/73 |
| 2003/0222413 | A1 * | 12/2003 | Hatanaka | G11B 33/1466 277/650 |
| 2006/0066824 | A1 * | 3/2006 | Knappe | G03F 7/70925 355/30 |
| 2006/0137432 | A1 * | 6/2006 | Kin | G01N 1/40 73/53.01 |
| 2006/0225571 | A1 * | 10/2006 | Higgins | B01D 53/04 95/116 |
| 2007/0182965 | A1 * | 8/2007 | Kamlet | G01N 21/05 356/437 |
| 2007/0242275 | A1 * | 10/2007 | Spartz | G01N 21/45 356/451 |
| 2010/0107731 | A1 * | 5/2010 | Kippeny | B01J 20/2808 73/23.41 |
| 2010/0223015 | A1 * | 9/2010 | Phillips | G01J 3/02 702/24 |
| 2010/0307335 | A1 * | 12/2010 | Hayward | B01D 53/02 95/95 |
| 2011/0171447 | A1 * | 7/2011 | Krishnamoorthy | H01L 21/02137 428/220 |
| 2012/0108450 | A1 * | 5/2012 | Jaworski | C07K 7/08 506/9 |
| 2013/0193325 | A1 * | 8/2013 | Phillips | G01N 21/3504 250/339.07 |
| 2013/0256583 | A1 * | 10/2013 | Schlenoff | H01F 1/0054 252/62.57 |
| 2014/0318217 | A1 * | 10/2014 | Li | G01N 33/0016 73/23.41 |
| 2015/0209717 | A1 * | 7/2015 | Ballantyne | B01D 53/04 95/116 |
| 2015/0260695 | A1 | 9/2015 | Spartz et al. | |
| 2016/0206990 | A1 * | 7/2016 | Bossan | B01D 53/0454 |
| 2017/0122888 | A1 * | 5/2017 | Heckner | G01N 23/223 |
| 2017/0226437 | A1 * | 8/2017 | Jurng | B01D 53/0462 |
| 2017/0299559 | A1 * | 10/2017 | Wyatt | G01N 30/8631 |
| 2017/0341056 | A1 * | 11/2017 | Spartz | B01D 11/04 |
| 2018/0045693 | A1 * | 2/2018 | Wyatt | G01N 30/74 |
| 2018/0045694 | A1 * | 2/2018 | Wyatt | B01D 53/025 |
| 2018/0180579 | A1 * | 6/2018 | Spartz | G01N 30/74 |
| 2018/0250896 | A1 * | 9/2018 | Matsumoto | B29C 71/02 |
| 2018/0252639 | A1 * | 9/2018 | Spartz | G01N 21/94 |
| 2019/0064127 | A1 * | 2/2019 | McPartland | G01J 3/18 |
| 2019/0064131 | A1 * | 2/2019 | Wyatt | G01N 30/8672 |
| 2019/0265205 | A1 * | 8/2019 | Spartz | G01N 1/2214 |

OTHER PUBLICATIONS

Gallego, E. et al., "Development of a method for determination of VOCs (including methylsiloxanes) in biogas by TD-GC/MS analysis using Supel™ Inert Film bags and multisorbent bed tubes," Intern. J. Environ. Anal. Chem., 95(4):291-311 (2015).

International Search Report and Written Opinion of the International Searching Authority, dated Jul. 5, 2017, from International Application No. PCT/US2017/026631, filed on Apr. 7, 2017. 17 pages.

International Preliminary Report on Patentability of the International Searching Authority, dated Oct. 18, 2018, from International Application No. PCT/US2017/026631, filed on Apr. 7, 2017. 9 pages.

Kim, K-H et al., "Conditions for the optimal analysis of volatile organic compounds in air with sorbent tube sampling and liquid standard calibration: demonstratin of solvent effect," Anal Bioanal Chem 405:8397-8408 (2013).

"On-site Monitoring of Siloxanes in Wastewater Digester and Landfill Gas", MAX Technology Application Note 704, from Prism Analytical Technologies, Inc., May 2015.

* cited by examiner

METHOD FOR IDENTIFICATION AND QUANTIFICATION OF SILOXANES IN GASEOUS STREAM

RELATED APPLICATIONS

This application is a § 371 National Phase Application of International Application No, PCT/US2017/026631, filed on Apr. 7, 2017, which claims the benefit under 35 USC 119(e) of U.S. Provisional Application No. 62/319,925, filed on Apr. 8, 2016, both of which are incorporated herein by reference in their entirety.

BACKGROUND OF THE INVENTION

Siloxane compounds have been measured using Fourier Transform Infrared (FTIR) spectroscopy, as discussed by Phillips et al., "Method and Apparatus for Siloxane Measurements in a Biogas", U.S. Pat. No. 8,462,347 B2. However, one disadvantage of this detection technique is that, since there is no separation of the gaseous components, all of the gaseous constituents have to be measured simultaneously by FTIR. This leads to significant errors due to background absorption of unwanted species, such as methane, $CO_2$, ethane and propane. In addition, since the various siloxane species have very similar infrared (IR) absorption features, it is impossible to effectively analyze each component separately via classical least squares and present a valid analytical number for each.

Phillips et al. proposed a surrogate analysis technique, where classes of siloxanes (linear or ring structures) were characterized by one or two members of each class. Even so, the detection limit was only about 200 parts-per-billion (ppb) due to signal-to-background limitations from imperfect fitting of the classical least squared spectral signatures of the background gases.

SUMMARY OF THE INVENTION

A need exists, therefore, for improved techniques that address and solve problems associated with existing approaches. In particular, a need exists for identifying and quantifying siloxane species in gaseous streams.

In general, aspects of the invention feature a method and system for detecting siloxanes using thermal desorption tubes and FTIR spectrometers with possibly intervening gas chromatography systems.

In one embodiment, for example, a method for detecting siloxanes comprises: collecting a sample in a thermal desorption tube; desorbing siloxanes from the thermal desorption tube; optionally separating the siloxanes by gas chromatography; and analyzing the desorbed siloxanes or the siloxanes separated by gas chromatography with a Fourier Transform Infrared Spectrometry system.

In another embodiment, a system for detecting siloxanes includes: a thermal desorption tube connected to a gas stream that contains siloxanes; a gas chromatography system for separating siloxanes desorbed from the thermal desorption tube; and a Fourier Transform Infrared Spectrometry system for identifying and quantifying the siloxanes separated by the gas chromatography system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
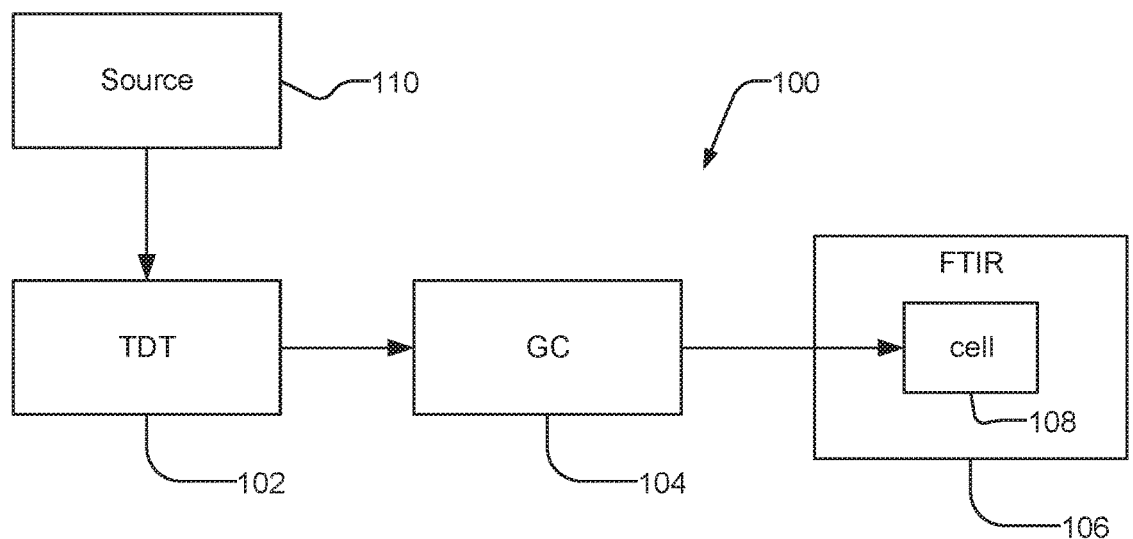
FIG. 1A is a schematic diagram showing an apparatus for sample analysis according to one embodiment of the present invention.

Embodiments of the present invention are designed to analyze a siloxane-containing sample by pre-concentrating the sample via sorption and thermal desorption, optionally separating the components in the desorbed sample via gas chromatography, and detecting individual siloxane components via FTIR. The siloxane-containing sample can be obtained from a gaseous stream by a sampling pump or other suitable means. In general, siloxanes are thought of as compounds having a molecular structure based on a chain of alternate silicon and oxygen atoms, having, for example, organic groups attached to the silicon atoms. Linear or cyclic, siloxanes often are present as an impurity in industrial or other fluid streams.

In specific aspects of the present invention, a gas chromatograph (GC) is used to separate a sample containing one or more siloxane compounds into different components, and Fourier Transform Infrared (FTIR) spectrometry is used for detecting the individual components. The GC/FTIR process and system have been discussed in detail by Spartz et al., "Process and System for Rapid Sample Analysis", in US published patent application, US2015/0260695 A1, now U.S. Pat. No. 9,606,088, issued Mar. 28, 2017, both of which are incorporated herein by this reference in their entirety. The on-site monitoring of siloxanes has also been described in "On-site Monitoring of Siloxanes in Wastewater Digester and Landfill Gas", MAX Technology Application Note 704, from Prism Analytical Technologies, Inc., May 2015.

In many cases, the FTIR system includes a sample or gas cell, provided, for example, with windows made of $BaF_2$, $CaF_2$, or another suitable material. The cell can be configured for multiple-path (also known as multiple-pass or long path) absorption. By increasing the path length traveled, multiple-pass arrangements can be used to measure low concentration components or to observe weak absorption spectral features without increasing the physical length or volume of the cell itself. Since the detection limit of the system is directly related to the volume/path length ratio, decreasing the volume or increasing the path length lowers the concentrations that can be detected. Assuming no signal losses, doubling the path length or reducing the volume in half will lower the detection limit by a factor of 2.

In certain embodiments, longer path lengths are used in combination with higher reflective coatings like enhanced silver, yielding a reflectivity in the 0.992 to 0.995 range or greater. Coating optimizations, in the IR region, for example, could further improve reflectivity. This allows for pathlengths that are longer by a factor or 4 to 8 or even more.

In specific implementations, the sample cell is configured as a "White cell" type. The principles of a traditional White cell arrangement employ three spherical concave mirrors having the same radius of curvature. These principles can be modified, to improve image quality and optical throughput, as described, for instance, by Spartz et al. in U.S. Patent Application Publication No. 2015/0260695 A1 (now U.S. Pat. No. 9,606,088). In one example, the White cell type employed uses non-spherical concave mirrors cut onto a single metal or a glass blank, providing a fixed path length; the mirrors can be the solid end caps of the sample cell, allowing for smaller sample cells that are easier to align.

Other multiple pass cell designs that can be utilized include but are not limited to Herriott cells, Pfund cells, cavity-ring down cells, and integrating spheres.

In other embodiments, a lightpipe flow sample cell is used.

FIG. 1A is a schematic diagram showing one embodiment of a system 100 for separating and detecting components in a siloxane-containing sample. The system 100 includes a thermal desorption tube (TDT) 102, a GC 104 and a FTIR spectrometer 106 with a sample cell 108.

A gaseous sample from a source 110 is introduced (e.g., impelled) into the TDT 102, where the constituents are adsorbed onto the sorption media and held for a period of time (the sampling time). During this sampling time, the concentrations of individual components build up as more gas is passed over the sorption media. After the sampling is ended, the TDT 102 is sealed with the adsorbed sample inside.

To analyze the individual components by GC/FTIR, a fast thermal ramp is applied to the sorption media in the TDT 102 to release the adsorbed contents. These contents are introduced into the GC 104, where they are chromatographically separated in a GC column. The separated components exit the GC 104 and are directed to the sample cell 108 for detection by the FTIR spectrometer 106. Using the algorithmic technique described in Spartz et al., "Process and System for Rapid Sample Analysis", US2015/0260695 A1, now U.S. Pat. No. 9,606,088, each individual siloxane component can be identified and quantified using FTIR.

This technique can be applied to measuring siloxanes in biogas streams, such that wastewater and landfill operators can get near-real time concentration profiles of siloxanes which may be coming through their filter media. This will allow the filter process to be stopped, saving any unwanted siloxanes from being burnt in the cogeneration engines or turbines, which could destroy either by abrasion of moving parts from the resultant silicates ("sand"). The detection of siloxanes is critical to the wastewater and landfill biogas operations, since excess siloxanes that are burnt during the combustion process to generate electricity through either reciprocation internal combustion engines (RICE) or microturbines can easily penetrate the pistons, bearings and oils used in these machines and abrade these parts, causing irreparable harm and requiring complete overhaul—leading to downtime. Examples of siloxanes that can be encountered in biogas streams include but are not limited to: hexamethyldisiloxane (L2); octamethyltrisiloxane (L3); decamethyltetrasiloxane (L4); hexamethylcyclotrisiloxane (D3); octamethylcyclotetrasiloxane (D4); decamethylcyclopentasiloxane (D5); dodecamethylcyclohexasiloxane (D6).

Figure 1B:
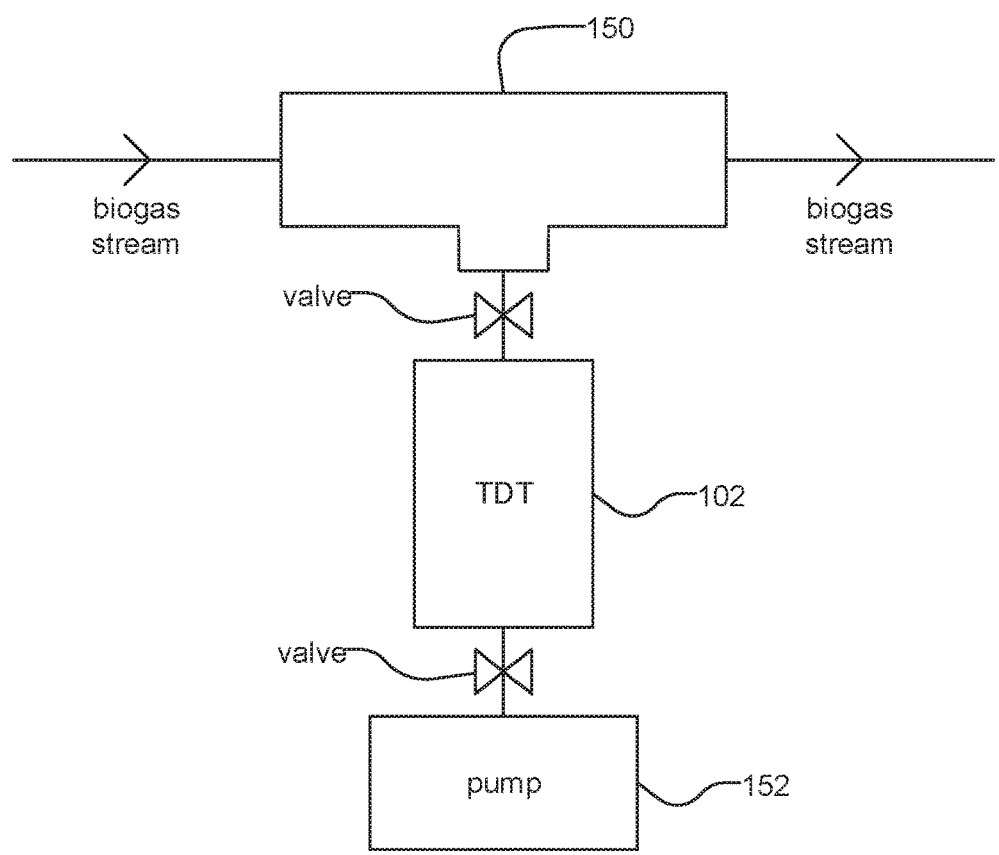
FIG. 1B is a schematic diagram showing an example of sample collection from a biogas stream.

FIG. 1B shows one example of the collection of one or more samples from a biogas stream. Sample collection in a TDT 102 was accomplished by attaching a T-shaped piece 150 to the biogas stream. For example, a slipstream was sampled for between 5 and 15 minutes (e.g., 3 separate acquisitions in 5 minute intervals) using an impelling pump 152 to draw the biogas through the thermal desorption tube 102. This is typically done at ambient temperature, e.g., about 25° C. to 30° C. The one or more desorption tubes 102 containing the biogas samples were then sealed for transport (e.g., to a different site for analysis) or for analysis at a later time. The TDT and/or sorbent material can be commercially available or can be modified or designed for this particular application. In one embodiment, the TDT is an AS002 model manufactured by Prism Analytical Technologies, Mt. Pleasant, Mich., USA. The AS002 is a general purpose thermal desorption tube, which is suitable for sorbing or adsorbing polar and non-polar materials, including siloxanes. Other tubes with similar or suitable sorption materials can also be used.

When a collected sample is ready for analysis, desorption was carried out by unsealing a TDT, and flowing a room temperature stream of nitrogen through the TDT to remove any bulk gases, such as $CO_2$, $CH_4$ and adsorbed water. Although other inert gases can be used as a purge gas, the use of nitrogen is more convenient and less costly than other inert gases such as argon or helium, among others. For example, the TDT can be purged with nitrogen at a flow rate range of about 10 mL/min to 200 mL/min and a temperature range of about 20° C. to 40° C. for a time period sufficient to remove most adsorbed species that may interfere with the separation and/or detection of siloxanes. In one example, a flow rate of about 100 mL/min at a temperature of about 25° C. for 5 min is typically used.

The temperature of the TDT was then raised to over 200° C., preferably about 280° C., to flash desorb the contents off the TDT and onto the GC column.

Various factors have to be considered in determining a suitable temperature ramp (or heating rate) for desorbing the siloxanes from the TDT into the GC. If the temperature ramp is too slow, the chromatographic separation is not as efficient because there will not be a sharp release of the materials into the GC column. As an example, a 35° C. to 280° C. ramp can be applied to the TDT from about 1 to 3 minutes in duration (corresponding to a range of about 245° C./min to 85° C./min). Furthermore, the final temperature level can be used as another parameter for optimizing the process for siloxanes separation and detection. For example, temperature ramping has been investigated at a final temperature range from about 230° C. to 280° C., and a nominal final temperature of about 260° C. Prior to applying the temperature ramp, however, water should be purged effectively from the TDT, so that water background in the GC can be minimized, while still providing reasonable chromatographic resolution.

The GC column was a standard MTX624 30 meter column that was temperature ramped from 35° C. to 250° C. for a period of about 50 minutes at a flow rate of approximately 2 mL/min. This was sufficient to separate the siloxanes into individual species. The MTX624 column is commercially available from Restek Corporation, Bellefonte, Pa., USA. Other 624-type of GC columns with an appropriate stationary phase (e.g., from other suppliers) can also be used.

The separated siloxanes were directed from the exit of the GC 104 to the sample cell 108 for detection by the FTIR spectrometer 106. IR absorption bands were monitored in the region from about 750 cm$^{-1}$ to 1300 cm$^{-1}$, which covers the Si—O stretches for the siloxanes.

Since this GC/FTIR technique chromatographically separates and individually analyzes each siloxane separated from the background, the detection limits are about 100 times better than conventional techniques. In addition, there is no need for surrogate methods of analysis to be used as in previous known techniques such as that discussed in Phillips et al., U.S. Pat. No. 8,462,347 B2. Instead, each siloxane can be characterized completely by itself.

The method of the present invention can also be used for monitoring or measuring siloxane levels in other applications or environments, e.g., during a lithographic laser ablation process for semiconductor manufacturing. For photolithographic tools in a semiconductor FAB (fabrication facility or cleanroom), extremely deep UV lasers are used to photo-etch microscopically small channels on the photoresist applied to silicon wafers. These channels will act as wires and electron transports in the chip being formed. Since the laser wavelengths used are almost ubiquitously absorbed by any material, extremely pure quartz lenses are used to focus the laser beam onto the photomasks. If any contaminant adsorbs onto the lens, it can be photo-burnt onto the lens, rendering the lens useless. The most common contaminant are siloxanes, which can emanate from silicone rubber materials (commonly used as thermal and electrical insulators) within the FAB.

If siloxanes enter into this laser ablation process, they could coat the precision lens materials and be ablated onto the surface of these lenses, destroying them and costing the manufacturer tens of millions of dollars. The method of the present invention is well-suited for monitoring or detection of siloxanes to avoid potential contaminations in the lithographic laser ablation process environment.

Figure 2:
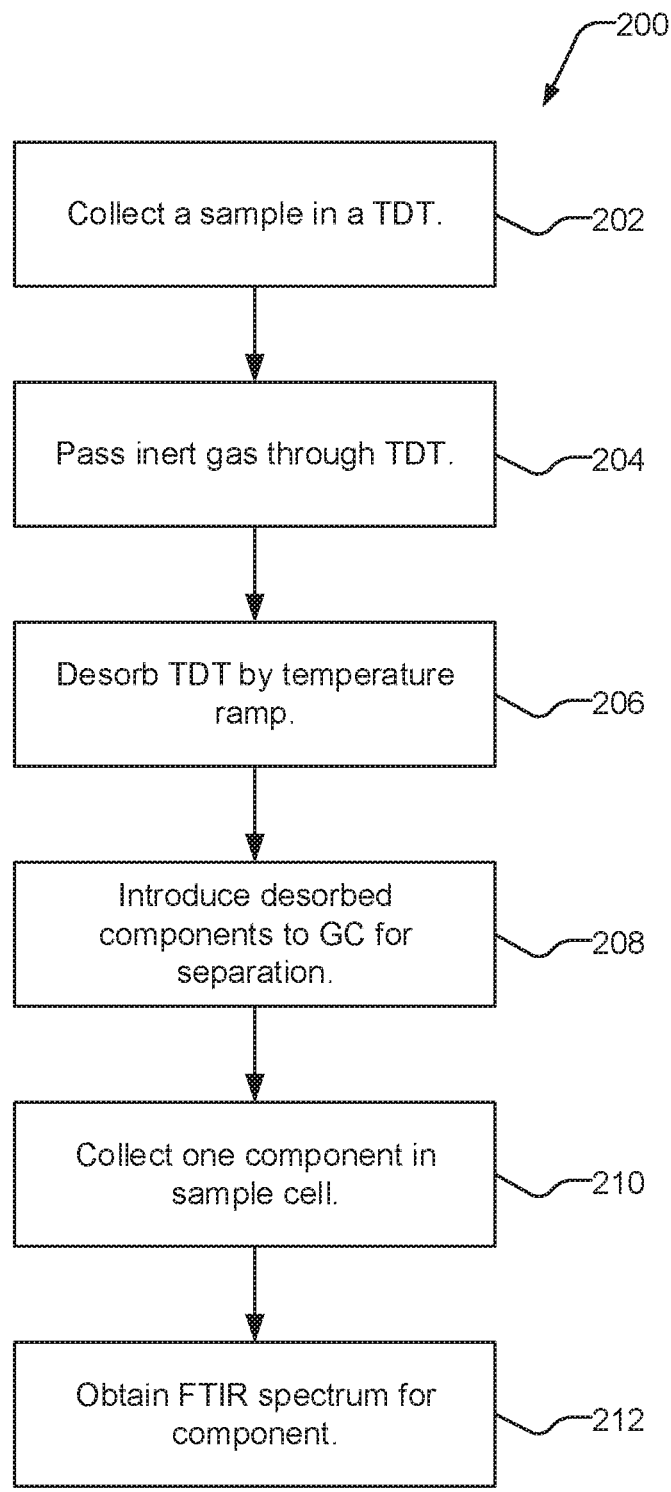
FIG. 2 is a flow chart illustrating a method of sample analysis according to one embodiment of the present principles.

FIG. 2 is a diagram illustrating a method 200 suitable for monitoring or detecting siloxanes according to one embodiment of the present principles. In step 202, a sample from a gas source is collected in a TDT with one or more suitable sorption materials for trapping siloxanes. The source of the gas sample can generally be any facilities or environments that produce or contain siloxanes. For example, the gas source can be a biogas stream from a variety of environments, or a gas sample from a semiconductor fabrication facility. In step 204, an inert gas (e.g., nitrogen), is passed through the TDT to remove any bulk gas (e.g., $CO_2$, C-h and adsorbed water, among others). In step 206, the TDT is subjected to a desorption process, which releases the adsorbed contents from the sorption material(s). For example, the adsorbed species can be desorbed by subjecting the TDT to a temperature ramp over a short time period, e.g., by spiking the temperature to about 280° C.

The gaseous components from the TDT are then introduced into a GC for separating into different components, as illustrated in step 208. In step 210, one of the separated components from the GC is allowed to enter a previously-evacuated sample cell, and allowed to accumulate for a certain time period. In step 212, the component collected in the sample cell after the given time period is subjected to FTIR detection and analysis. By increasing the amount of the component in the cell before performing FTIR, the absorption signal for the component can be improved (compared to using a flow cell configuration). Steps 210 and 212 are repeated for each of the GC-separated components, as appropriate.

Other details of the apparatus and method for sample analyzing using GC/FTIR can be found in Spartz et al., US published patent application US2015/0260695 A1 and U.S. Pat. No. 9,606,088.

Aspects of the invention are further illustrated in the following non-limiting example.

EXAMPLE

Figure 3A:
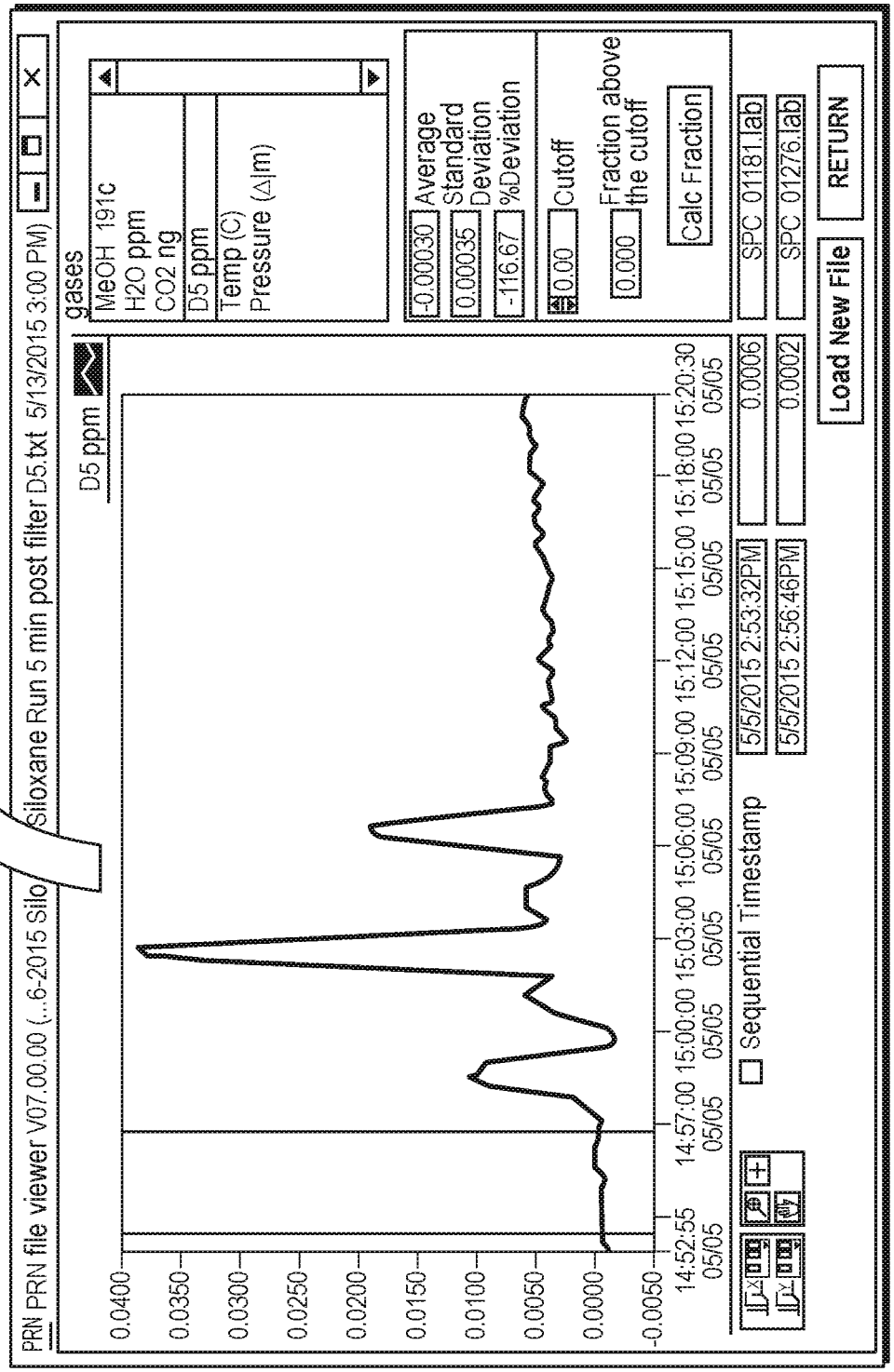
FIG. 3A is a GC plot of a sample collected from a post filter biogas stream.
Figure 3B:
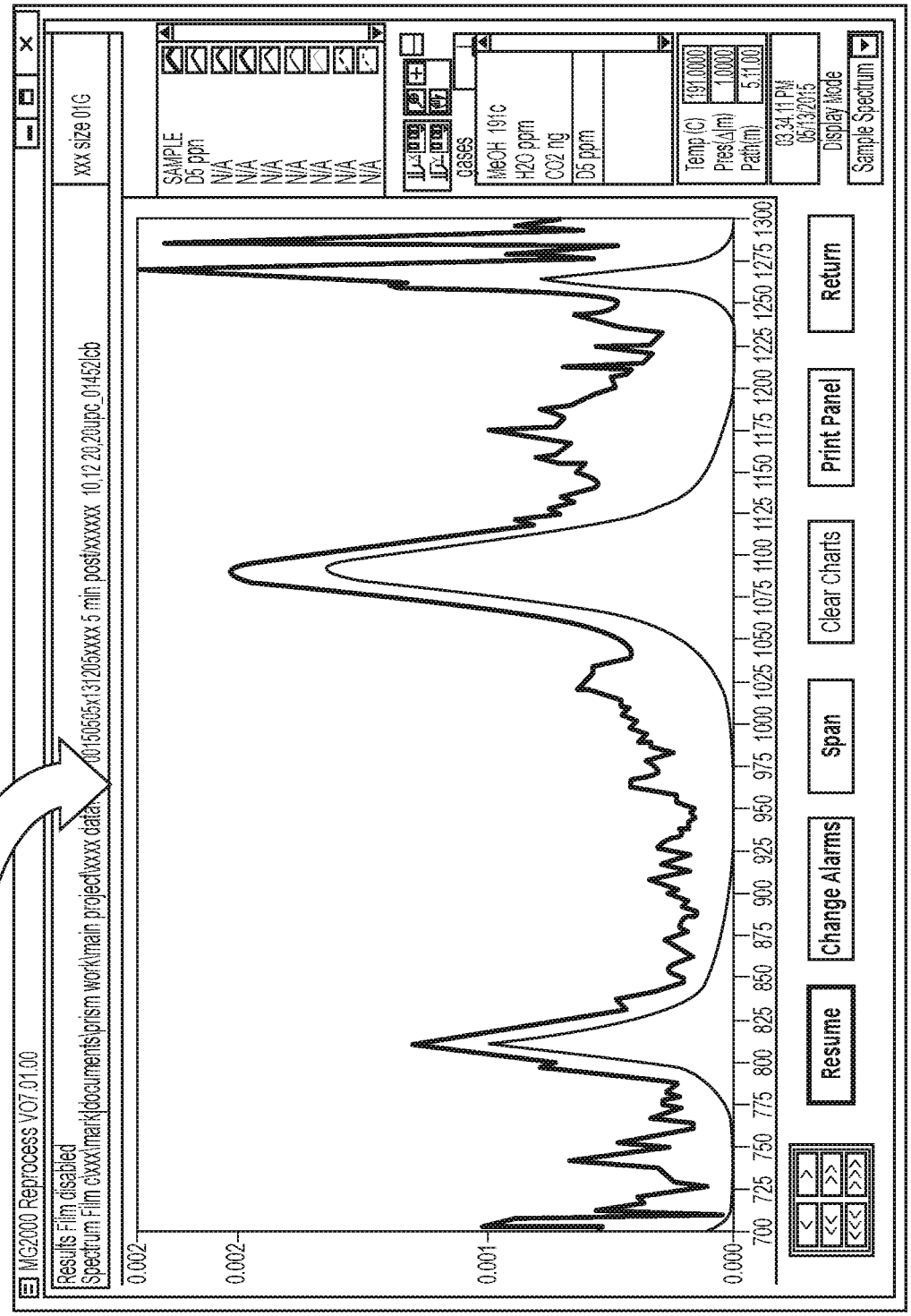
FIG. 3B is a FTIR spectrum of one of the siloxanes in FIG. 3A.

Samples of pre- and post-filtered biogas were acquired from a wastewater treatment facility. Adsorption tubes were exposed for 5 minute to each stream at a flow rate of about 150 mL/min, or an equivalent volume of 0.75 L. The tube's contents were processed and introduced into a MAX™ analyzer, insuring that the light hydrocarbons, $CO_2$ and $H_2O$ would be flushed before they could reach the column. The column was operated and the GC separation was spectroscopically analyzed by the FTIR. A representative "chromatogram" and its associated infrared spectrum (FIG. 3B) are shown, respectively, in FIGS. 3A and 3B. This is one of the eluting siloxanes, dodecamethyl-cyclopentasiloxane, also known as D5, which originated from the post-filtered biogas stream. The detected amount of 39 ppb (equivalent to 10 ppb in the gas stream (is still some 25× higher than the calculated detection limit of 1.5 ppb (400 pptr in gas stream). The table below lists the results of a 5 minute sample through thermal desorption tubes for both pre- and post-filter sampling.

| Siloxane | Pre-Filter Concentration (ppm) | Post-Filer Concentration (ppm) |
|---|---|---|
| D4 | 0.242 | 0.015 |
| D5 | 1.010 | 0.039 |
| D6 | 0.231 | 0.019 |

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for detecting siloxanes, the method comprising:
    collecting a sample in a thermal desorption tube;
    passing a purge gas through the thermal desorption tube prior to desorbing siloxanes;
    then raising the temperature of the thermal desorption tube desorbing the siloxanes from the thermal desorption tube;
    separating the siloxanes by gas chromatography in a column; and
    analyzing the siloxanes separated by gas chromatography with a Fourier Transform Infrared Spectrometry system.

2. The method of claim 1, wherein siloxanes are desorbed from the sample by heating to a temperature of at least 200° C.

3. The method of claim 1, wherein the Fourier Transform Infrared Spectrometry system includes a sample cell configured in a multiple path optical arrangement.

4. The method of claim 1, wherein the purge gas is nitrogen or wherein the purge gas removes $CO_2$, light hydrocarbons, water, or any combination thereof.

5. The method of claim 1, wherein the Fourier Transform Infrared Spectrometry system identifies and quantifies individual siloxanes.

6. The method of claim 1, wherein the sample is collected from a biogas stream or from a gas stream found in semiconductor processing.

7. The method of claim 1, wherein the sample is collected by drawing gas from a gas stream into the thermal desorption tube using a pump.

8. The method of claim 1, wherein the siloxanes include one or more of hexamethyldisiloxane (L2); octamethyltrisiloxane (L3); decamethyltetrasiloxane (L4 hexamethylcyclotrisiloxane (D3); octamethylcyclotetrasiloxane (D4); decamethylcyclopentasiloxane (D5); dodecamethylcyclohexasiloxane (D6).

9. A system for detecting siloxanes, the system comprising:
   a thermal desorption tube connected to a gas stream that contains siloxanes;
   a gas chromatography system for separating siloxanes desorbed from the thermal desorption tube; and
   a Fourier Transform infrared Spectrometry system for identifying and quantifying the siloxanes separated by the gas chromatography system;
   wherein a purge gas is passed through the thermal desorption tube prior to raising a temperature of the thermal desorption tube and desorbing the siloxanes.

10. The system of claim 9, wherein the Fourier Transform Infrared Spectrometry system includes a sample cell configured in a multiple path optical arrangement.

11. The system of claim 9, further comprising a pump for drawing gas from the gas stream into the thermal desorption tube.

12. The system of claim 9, wherein the gas stream is a biogas stream or a gas stream found in semiconductor processing.

13. The method of claim 1, wherein the thermal desorption tube is raised to a temperature range of about 20° C. to 40° C. while passing the purge gas through the sample desorption tube.

14. The method of claim 13, wherein the thermal desorption tube is thereafter raised to a temperature of over 200° C., to flash desorb the siloxanes onto the column.

15. The system of claim 9, wherein the thermal desorption tube is raised to a temperature range of about 20° C. to 40° C. while passing the purge gas through the sample desorption tube.

16. The system of claim 15, wherein the thermal desorption tube is thereafter raised to a temperature of over 200° C., to flash desorb the siloxanes onto the column.

* * * * *